US011396054B2

(12) United States Patent
Rakurty et al.

(10) Patent No.: US 11,396,054 B2
(45) Date of Patent: Jul. 26, 2022

(54) METHOD OF CUTTING WITH A BAND SAW

(71) Applicant: The M.K. Morse Company, Canton, OH (US)

(72) Inventors: Chandra Sekhar Rakurty, Massillon, OH (US); Roan Murphy Kirwin, Canton, OH (US)

(73) Assignee: The M.K. Morse Company, Canton, OH (US)

( * ) Notice: Subject to any disclaimer, the term of this patent is extended or adjusted under 35 U.S.C. 154(b) by 76 days.

(21) Appl. No.: 17/079,301

(22) Filed: Oct. 23, 2020

(65) Prior Publication Data
US 2021/0316380 A1 Oct. 14, 2021

Related U.S. Application Data

(60) Provisional application No. 63/007,157, filed on Apr. 8, 2020.

(51) Int. Cl.
*B23D 59/00* (2006.01)
*B23D 55/06* (2006.01)

(52) U.S. Cl.
CPC ........... *B23D 59/001* (2013.01); *B23D 55/06* (2013.01)

(58) Field of Classification Search
CPC ...... B23D 59/001; B23D 55/06; B23D 55/08; B23D 55/082; B23D 53/02; B23D 55/065; B23D 55/10; G05B 19/402; G05B 2219/45044; G05B 2219/50047
USPC ....................................................... 83/13, 74
See application file for complete search history.

(56) References Cited

U.S. PATENT DOCUMENTS

| | | | | | |
|---|---|---|---|---|---|
| 3,680,417 | A | * | 8/1972 | Wells | B23D 55/084 83/62.1 |
| 4,179,966 | A | * | 12/1979 | Ginnow | B28D 1/005 83/820 |
| 5,070,751 | A | * | 12/1991 | Harris | B23D 55/084 83/820 |
| 6,382,062 | B1 | * | 5/2002 | Smith | B23Q 15/12 83/76 |
| 2011/0296971 | A1 | * | 12/2011 | Rudolph | B23D 55/084 83/820 |
| 2015/0020660 | A1 | * | 1/2015 | Jeng | B23D 59/001 83/74 |
| 2015/0158097 | A1 | * | 6/2015 | Myrfield | B27B 15/04 83/403.1 |
| 2015/0183037 | A1 | * | 7/2015 | Jeng | B23D 55/06 83/788 |
| 2018/0169776 | A1 | * | 6/2018 | Chiao | B23D 59/001 |

* cited by examiner

*Primary Examiner* — Ghassem Alie
(74) *Attorney, Agent, or Firm* — Black, McCuskey, Souers & Arbaugh LPA

(57) ABSTRACT

A method of cutting a workpiece with a band saw includes rotating, with a band saw machine, a blade about a central longitudinal axis. The method also includes supporting a back edge of the blade during the rotating with a back support and a first lateral side edge with a first lateral side support. The method also includes monitoring, with a first sensor, a first level of force exerted against the back support and, with a second sensor, a second level of force exerted against the first lateral side support. The method also includes moving the blade along the axis during the rotating. The method also includes dynamically controlling, with a computing device, the band saw machine during the moving in response to at least one of the first level of force and the second level of force.

17 Claims, 6 Drawing Sheets

METHOD OF CUTTING WITH A BAND SAW

CROSS-REFERENCE TO RELATED APPLICATIONS

This application claims the benefit of U.S. Provisional Patent Application Ser. No. 63/007,157 for a SAW BLADE AND METHOD OF CUTTING, filed on 2020 Apr. 8, which is hereby incorporated by reference in its entirety.

BACKGROUND

The present disclosure relates in general to cutting tools.

For a given blade, the number of teeth per inch of length of a cutting edge, the "TPI," is fixed. The TPI along with gullet size, width and depth of the space between the teeth generally dictates the kinds of material that can be cut with the blade. The TPI of a blade also tends to dictate the range of workpiece sizes that can be cut with the blade. Blades with a low TPI generally deliver faster cuts with rougher edges and are ideal for cutting wood. A general rule of thumb is that a saw blade with more teeth results in a smoother cut and a saw blade with fewer teeth results in a faster cut. Other considerations impact the cut quality and the feed speed, such as how fast the material is fed into the saw blade and how fast the saw blade is turning.

Blades are utilized in bandsaws. The blade of a bandsaw is a continuous band of toothed metal stretched between two or more wheels. The wheels are rotated to pass the blade through the material. Bandsaws can be used in woodworking, metalworking, and lumbering. Bandsaws can be utilized to cut a variety of materials.

FIG. 1 is a side view of a blade during a cutting process by a bandsaw. A blade 10 includes at least one tooth 12. The tooth 12 defines a tip 14 and a cutting face 16. The blade 10 is passing through a workpiece 18 to remove material from the workpiece 18. The direction of movement of the blade 10 is referenced at 20. A present outer surface of the workpiece 18 is referenced at 22 and a cutting depth 24. A surface that will be exposed after the cutting motion is referenced at 26.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of cutting a workpiece with a band saw includes rotating, with a band saw machine, a blade about a central longitudinal axis. The method also includes supporting a back edge of the blade during the rotating with a back support. The method also includes supporting a first lateral side edge of the blade during the rotating with a first lateral side support. The method also includes monitoring, with a first sensor, a first level of force exerted against the back support. The method also includes monitoring, with a second sensor, a second level of force exerted against the first lateral side support. The method also includes moving, with the band saw machine, the blade along the central longitudinal axis during the rotating. The method also includes dynamically controlling, with a computing device having one or more processors, the band saw machine during the moving in response to at least one of the first level of force and the second level of force.

BRIEF DESCRIPTION OF THE DRAWINGS

The detailed description set forth below references the following drawings.

DETAILED DESCRIPTION

The present disclosure allows a blade having a fixed TPI to be utilized beyond its applicable range as defined by the prior art. The present disclosure includes altering the path of cutting movement of the blade. The movement of the blade can be controlled by a powered tool, such as a bandsaw. Thus, the path of movement followed by the blade can be implemented by the powered tool in which the blade is mounted. In one exemplary embodiment, the blade can rock back and forth in the cut, like a logger cuts wood. End users can enjoy using a single blade across a plurality of ranges and also enjoy enhanced blade life.

Figure 1:
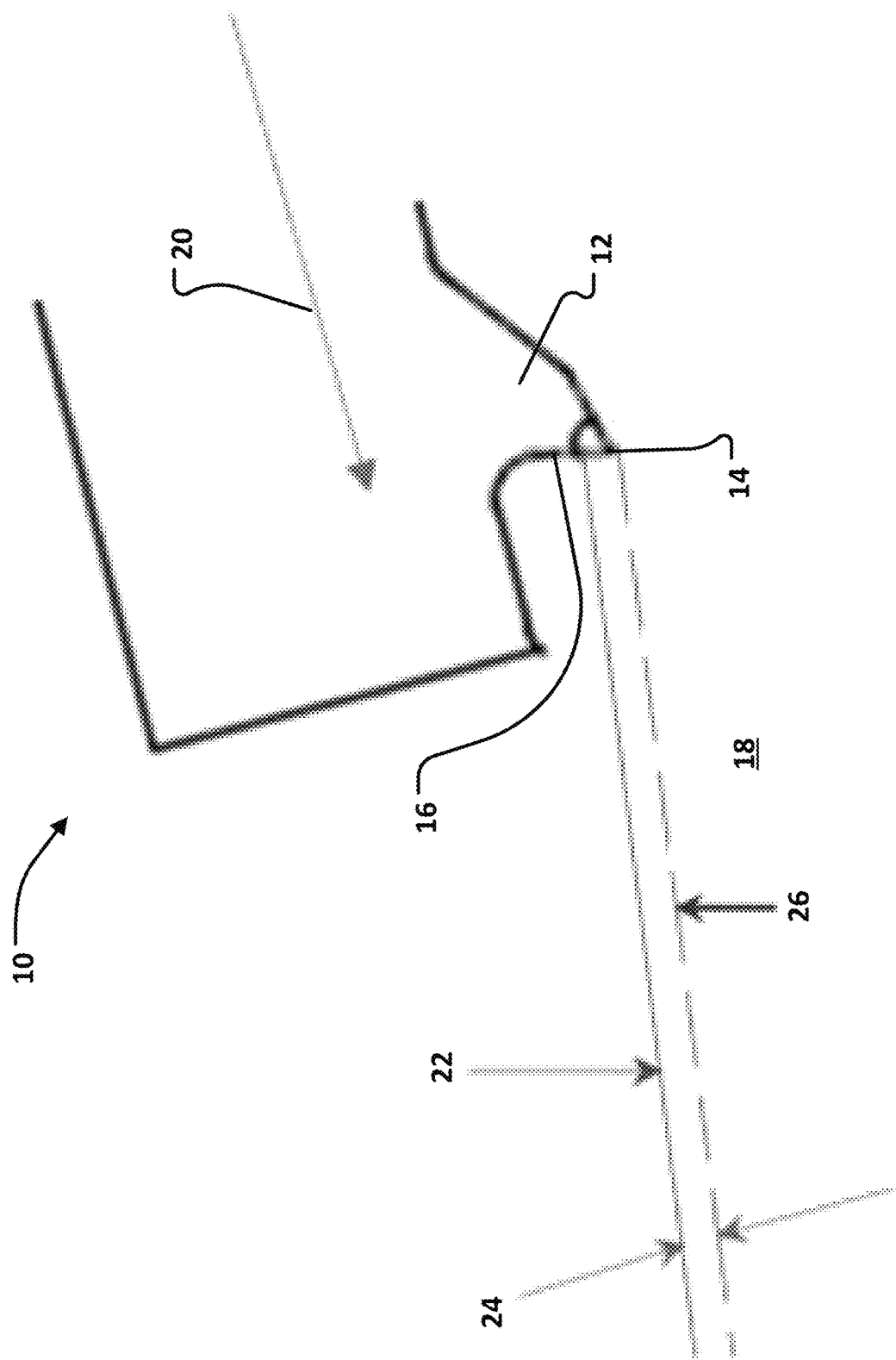
FIG. 1 is a side view of a blade during a cutting process according to the prior art.
Figure 2:
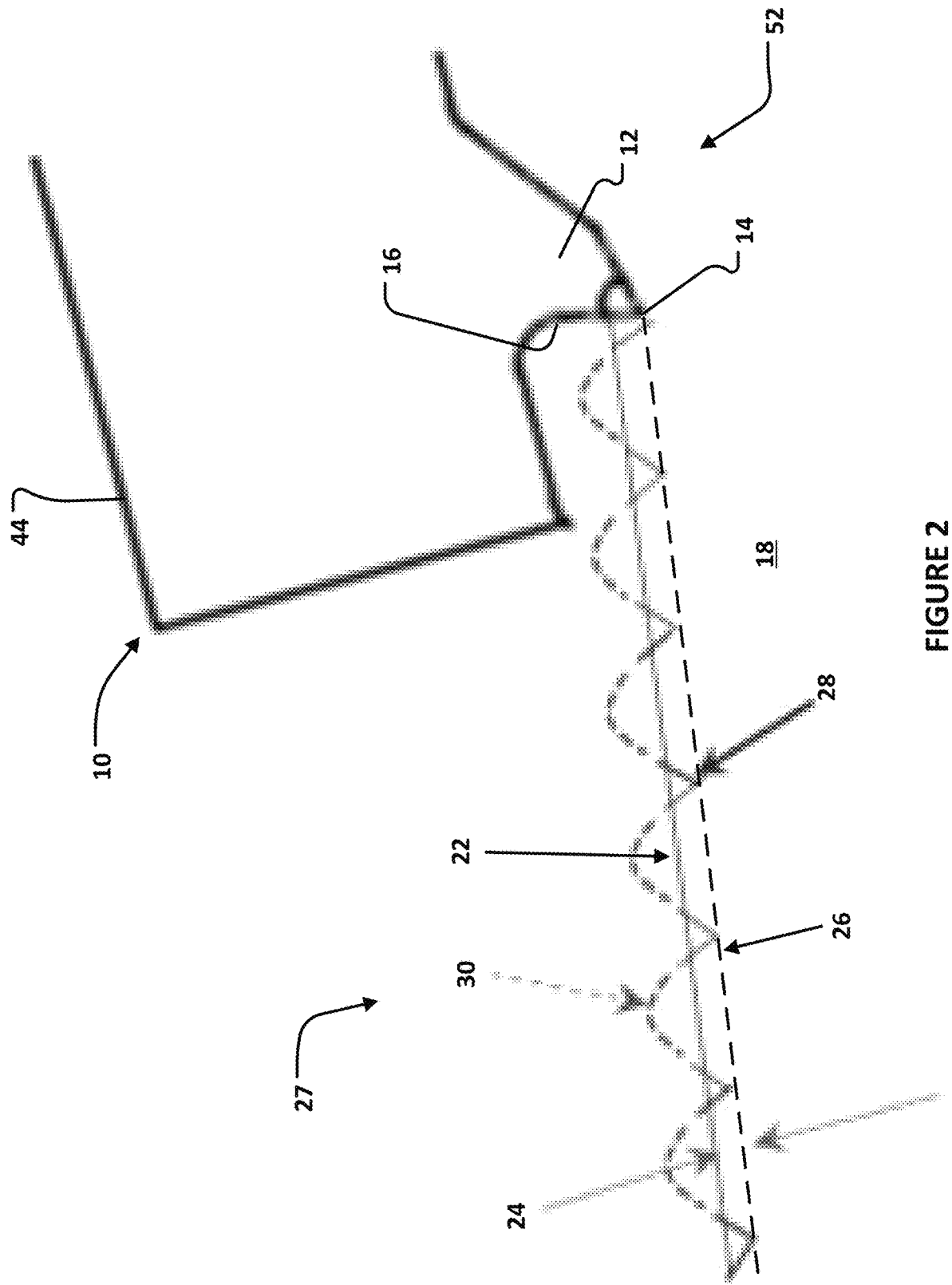
FIG. 2 is a side view of a blade during a cutting process according to the present disclosure.

Referring now to the drawings, there is illustrated in FIG. 2 a side view of the blade 10 during a cutting process according to the present disclosure. The exemplary blade 10 is a bandsaw blade. The blade 10 includes the at least one tooth 12 that defines the tip 14 and the cutting face 16. While only one tooth 12 is shown, the blade 10 can include a plurality of teeth. The blade 10 is passing through the workpiece 18 to remove material from the workpiece 18. The present outer surface 22 of the workpiece 18 will be removed to the cutting depth 24 to expose the surface 26.

An exemplary path 27 of motion of the tip 14 is represented by solid-line portions and dashed-line portions. An exemplary solid-line portion is referenced at 28. During the movement along the portion of the path 27 referenced by solid-line portions, the tooth 12 is engaged with the workpiece and removing material. An exemplary dashed-line portion is referenced at 30. During the movement along the portion of the path 27 referenced by dashed-line portions, the tooth 12 is disengaged with the workpiece and not removing material. The exemplary path 27 thus defines a pulsating motion of the blade 10, the motion having a frequency and an amplitude.

The path 27 is exemplary. Paths applied to the blade 10 in other embodiments of the present disclosure can be differently shaped. In one example, the blade 10 can be moved along a path appearing in a Figure such as FIG. 2 as a square-wave. When such a path is chosen, the tooth 12 can move linearly through part of the workpiece 18, can be raised vertically away from the workpiece 18, can move linearly over the workpiece 18, and then be lowered vertically back into the workpiece 18.

A bandsaw tool can be configured to move the blade 10 along the path 27. In the prior art, a bandsaw is operated based on selecting the speed of the blade 10 and the feed rate. The speed of the blade 10 corresponds to movement of the blade 10 in a direction across the workpiece 18. The feed rate corresponds to movement of the blade 10 into the workpiece 18. In the present disclosure, a bandsaw can be configured to be operated based on selecting the speed of the blade 10, the feed rate, a frequency, and an amplitude.

Figure 3:
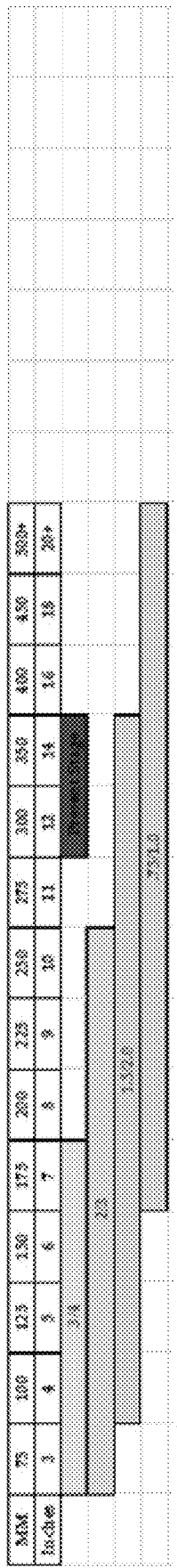
FIG. 3 is a table comparing the applicability of a blade according to the prior art relative to the size of a workpiece.
Figure 4:
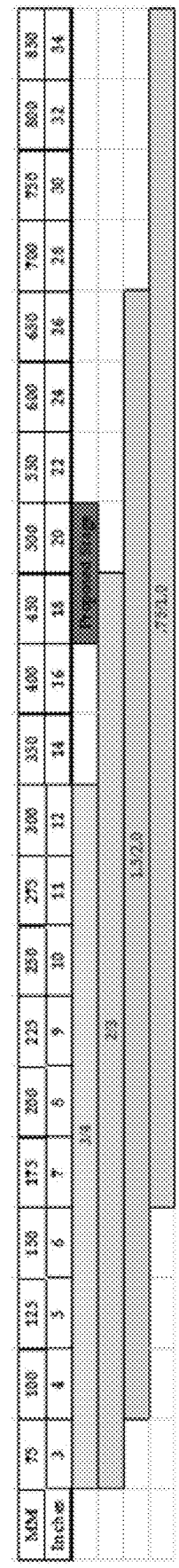
FIG. 4 is a table comparing the applicability of a blade according to the present disclosure relative to the size of a workpiece.

FIGS. 3 and 4 are tables comparing the applicability of a blade according to the prior art and to the present disclosure, relative to the size of a workpiece. The values of length in the tables correspond to sizes of workpieces. The bands below the values of length correspond to TPI values. The table of FIG. 3 shows that, according to the prior art, a blade having a TPI of ¾ can be utilized in workpieces between 3-7 inches. The table of FIG. 4 shows that the same blade, when moved during cutting according to the present disclosure, can be utilized in workpieces between 3-12 inches. The tables also show that blades of all TPIs can be more-broadly used by being moved during cutting according to the present disclosure.

Figure 5:
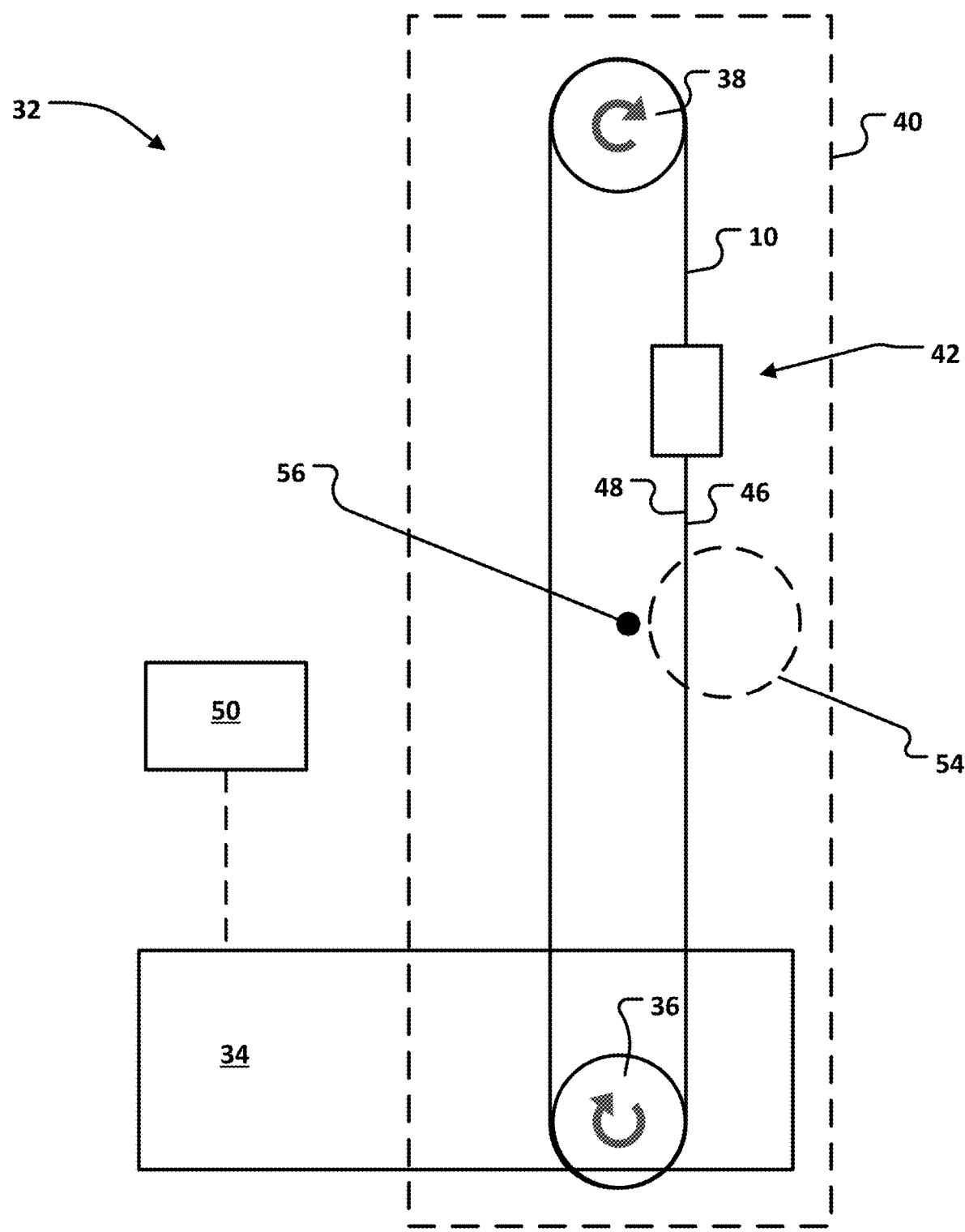
FIG. 5 is a schematic front view of band saw machine on which the exemplary blade is mounted and moved.
Figure 6:
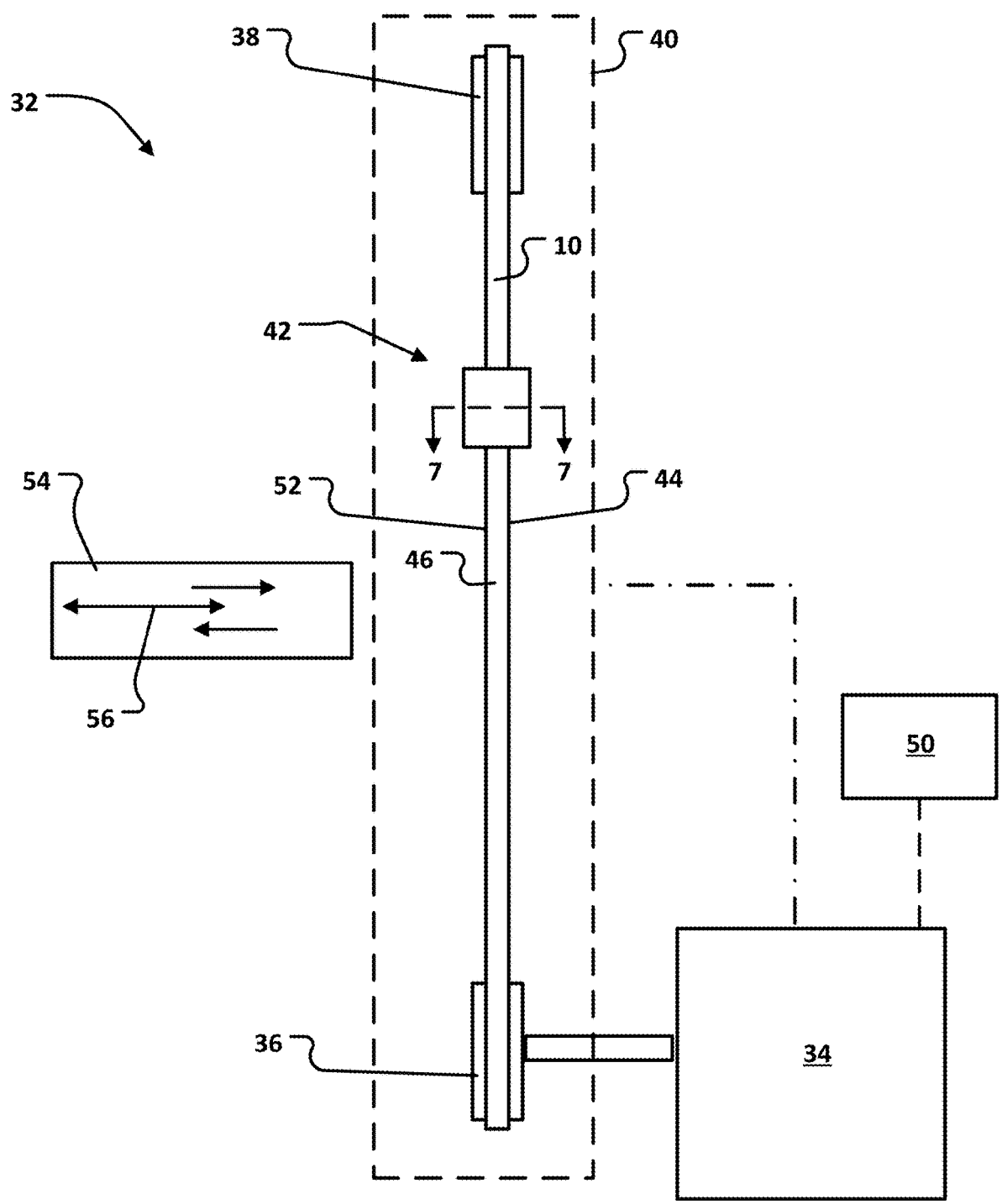
FIG. 6 is a schematic side view of the band saw shown in FIG. 5.
Figure 7:
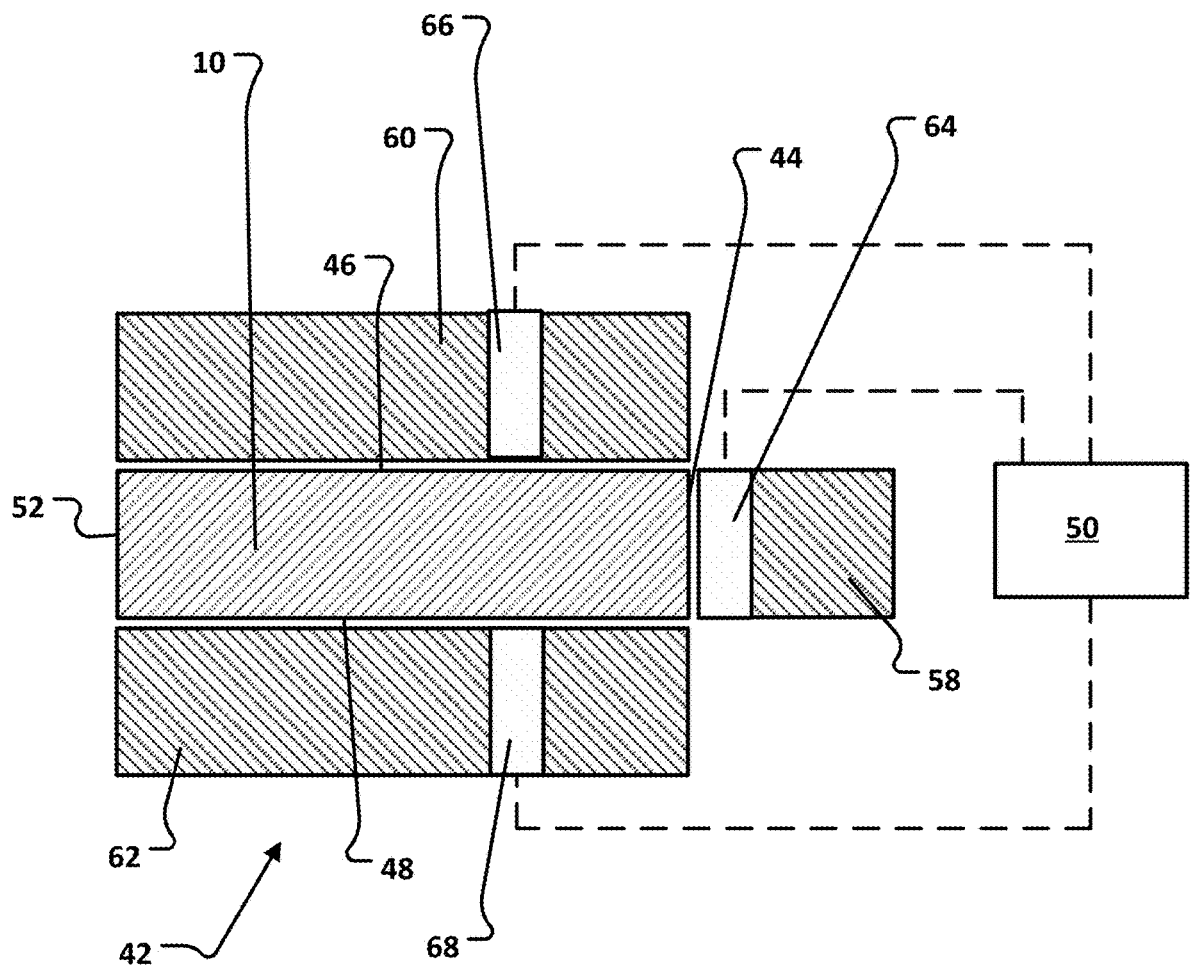
FIG. 7 is a section view taken along section lines 7-7 in FIG. 6.

Referring now to FIGS. 5-7, a band saw machine 32 includes a motor assembly 34, the blade 10, a driving wheel 36, an idler wheel 38, a frame 40 (referenced in dash line), a controller 50, and at least one supporting block 42. The exemplary motor assembly 34 includes a motor and one or more transmission assemblies so that power generated by the motor can be output as desired. In the exemplary embodiment, the motor assembly 34 includes a first transmission assembly transmitting power to the driving wheel 36 to rotate the driving wheel 36 and a second transmission assembly transmitting power to rectilinearly move the frame 40. The driving wheel 36 and the idler wheel 38 are mounted for rotation on the frame 40. The blade 10 extends around both the driving wheel 36 and the idler wheel 38. The supporting block 42 can also be mounted on the frame 40 and surrounds the blade 10 on three sides: the back edge 44, a first lateral side edge 46, and a second lateral side edge 48. The toothed-edge 52 of the blade 10 is exposed. The band saw machine 32 can include a plurality of supporting blocks positioned around the frame 40 so that the blade 10 is supported at a plurality of locations.

In an exemplary method of cutting a workpiece 54 with the band saw machine 32, the band saw machine 32 can rotate the blade 10 about a central longitudinal axis 56. The back edge 44 of the blade 10 can be supported during rotation with a back support 58 of the supporting block 42. The first lateral side edge 46 of the blade 10 can be supported during rotation with a first lateral side support 60 of the supporting block 42. The second lateral side edge 48 of the blade 10, opposite to the first lateral side edge 46, can be supported during rotation with a second lateral side support 62 of the supporting block 42. The supports 58, 60, 62 can prevent movement of the blade 10, respectively, away from the workpiece 54 and to lateral sides.

The exemplary band saw machine 32 includes a first sensor 64, a second sensor 66 and a third sensor 68. A first level of force exerted against the back support 58 can be monitored with the first sensor 64. The first sensor 64 can transmit sensed conditions to the controller 50. A second level of force exerted against the first lateral side support 60 can be monitored with a second sensor 66. The second sensor 66 can transmit sensed conditions to the controller 50. A third level of force exerted against the second lateral side support 62 can be monitored with a third sensor 68. The third sensor 68 can transmit sensed conditions to the controller 50.

It is noted that the first sensor 64, second sensor 66, and/or the third sensor 68 can be a pressure sensor or a piezoelectric sensor, or some other form of sensor that can sense conditions corresponding to force.

The exemplary band saw machine 32 is configured to move the blade 10 along the central longitudinal axis 56 during the rotating. As noted above, a motor of the band saw machine 32 can be utilized to both rotate the blade 10 about the central longitudinal axis 56 and also to move the blade 10 along the central longitudinal axis 56 in one or more embodiments of the present disclosure. In such embodiments, the band saw machine 32 can include appropriate transmissions for transmitting power generated by the motor to rotate and translate. The exemplary controller 50 is a computing device having one or more processors configured to dynamically control the band saw machine 32 during the rotating and during the moving. The exemplary controller 50 is configured to dynamically control the band saw machine 32 during the moving in response to at least one of the first level of force, the second level of force, and the third level of force. The controller 50 can be configured to dynamically control the band saw machine 32 during the moving in response to all of the first level of force, the second level of force and the third level of force.

The exemplary controller 50 can be configured to dynamically control the band saw machine 32 whereby a direction of rectilinear movement of the blade 10 along the central longitudinal axis 56 is changed in response to an increase in the first level of force sensed by the first sensor 64. For example, the controller 50 can control the motor of the band saw machine 32 to stop moving the blade 10 toward the workpiece 54 and instead move the blade 10 away from the workpiece 54 in response to a predetermined amount of increase in the first level of force. In another example, a change in the rectilinear direction of movement of the blade 10 along the central longitudinal axis 56 can be defined by stopping rectilinear movement. For example, the controller 50 can control the motor of the band saw machine 32 to stop moving the blade 10 toward the workpiece 54 and cease movement along the central longitudinal axis 56 in response to a predetermined amount of increase in the first level of force. The predetermined amount can be defined by a nominal value of force in Newtons or by a percentage change in the level of force.

The exemplary controller 50 can be configured to dynamically control the band saw machine 32 to change a direction of rectilinear movement of the blade 10 along the central longitudinal axis 56 in response to a decrease in the first level of force sensed by the first sensor 64. For example, the controller 50 can control the motor of the band saw machine 32 to stop moving the blade 10 away from the workpiece 54 and instead move the blade 10 toward the workpiece 54 in response to a predetermined amount of decrease in the first level of force. In another example, a change in the rectilinear direction of movement of the blade 10 along the central longitudinal axis 56 can also be defined by stopping rectilinear movement. For example, the controller 50 can control the motor of the band saw machine 32 to stop moving the blade 10 away from the workpiece 54 and cease movement along the central longitudinal axis 56 in response to a predetermined amount of decrease in the first level of force.

The exemplary controller 50 can be configured to dynamically control the band saw machine 32 to change a velocity of rectilinear movement of the blade 10 along the central longitudinal axis 56 in response to an increase in the first level of force sensed by the first sensor 64. For example, the controller 50 can control the motor of the band saw machine 32 to slow movement of the blade 10 along the central longitudinal axis 56 toward the workpiece 54 in response to a predetermined amount of increase in the first level of force. Similarly, the exemplary controller 50 can be configured to dynamically control the band saw machine 32 to change a velocity of rectilinear movement of the blade 10 along the central longitudinal axis 56 in response to a decrease in the first level of force sensed by the first sensor 64. For example, the controller 50 can control the motor of the band saw machine 32 to increase a speed movement of the blade 10 along the central longitudinal axis 56 toward the workpiece 54 in response to a predetermined amount of decrease in the first level of force.

The exemplary controller 50 can be configured to dynamically control the band saw machine 32 to change an acceleration of rectilinear movement of the blade 10 along the central longitudinal axis 56 in response to an increase in the first level of force sensed by the first sensor 64. For example, the controller 50 can control the motor of the band saw machine 32 to accelerate the movement of the blade 10 along the central longitudinal axis 56 toward the workpiece 54 in response to a predetermined amount of increase in the first level of force. The velocity of movement and direction of movement need not necessarily change in response to an increase in acceleration. An increase in acceleration could allow an instantaneous rectilinear velocity of the blade 10 along the central longitudinal axis 56 to be maintained. Similarly, the exemplary controller 50 can be configured to dynamically control the band saw machine 32 to change an acceleration of rectilinear movement of the blade 10 along the central longitudinal axis 56 in response to a decrease in the first level of force sensed by the first sensor 64. For example, the controller 50 can control the motor of the band saw machine 32 to deaccelerate the movement of the blade 10 along the central longitudinal axis 56 toward the workpiece 54 in response to a predetermined amount of decrease in the first level of force. The velocity of movement and direction of movement need not necessarily change in response to an decrease in acceleration.

The exemplary controller 50 can be configured to dynamically control the band saw machine 32 to change a direction of rectilinear movement of the blade 10 along the central longitudinal axis 56 in response to an increase in the second level of force sensed by the second sensor 66 and/or in response to an increase in the third level of force sensed by the third sensor 68. For example, the controller 50 can control the motor of the band saw machine 32 to stop moving the blade 10 toward the workpiece 54 and instead move the blade 10 away from the workpiece 54 in response to a predetermined amount of increase in the second level of force. Increases in the sensed second and third levels of force can be indicative of excessive stress on the blade 10. It is noted that a level of force sensed by the second or third sensors 66, 68 that results in a change in direction can be greater than a level of force sensed by the first sensor 64 that results in a change in direction.

The exemplary controller 50 can be configured to dynamically control the band saw machine 32 to change a direction of rectilinear movement of the blade 10 along the central longitudinal axis 56 in response to a decrease in the second level of force sensed by the second sensor 66 and/or in response to an decrease in the third level of force sensed by the third sensor 68. For example, the controller 50 can control the motor of the band saw machine 32 to stop moving the blade 10 away from the workpiece 54 and instead move the blade 10 toward the workpiece 54 in response to a predetermined amount of decrease in the second level of force. In another example, a change in the rectilinear direction of movement of the blade 10 along the central longitudinal axis 56 can also be defined by stopping rectilinear movement. For example, the controller 50 can control the motor of the band saw machine 32 to stop moving the blade 10 away from the workpiece 54 and cease movement along the central longitudinal axis 56 in response to a predetermined amount of decrease in the second level of force.

The exemplary controller 50 can be configured to dynamically control the band saw machine 32 to change a velocity of rectilinear movement of the blade 10 along the central longitudinal axis 56 in response to an increase in the second level of force sensed by the second sensor 66. For example, the controller 50 can control the motor of the band saw machine 32 to slow movement of the blade 10 along the central longitudinal axis 56 toward the workpiece 54 in response to a predetermined amount of increase in the second level of force. Similarly, the exemplary controller 50 can be configured to dynamically control the band saw machine 32 to change a velocity of rectilinear movement of the blade 10 along the central longitudinal axis 56 in response to a decrease in the second level of force sensed by the second sensor 66. For example, the controller 50 can control the motor of the band saw machine 32 to increase a speed movement of the blade 10 along the central longitudinal axis 56 toward the workpiece 54 in response to a predetermined amount of decrease in the second level of force.

The exemplary controller 50 can be configured to dynamically control the band saw machine 32 to change an acceleration of rectilinear movement of the blade 10 along the central longitudinal axis 56 in response to an increase in the second level of force sensed by the second sensor 66. For example, the controller 50 can control the motor of the band saw machine 32 to accelerate the movement of the blade 10 along the central longitudinal axis 56 toward the workpiece 54 in response to a predetermined amount of increase in the second level of force. Similarly, the exemplary controller 50 can be configured to dynamically control the band saw machine 32 to change an acceleration of rectilinear movement of the blade 10 along the central longitudinal axis 56 in response to a decrease in the second level of force sensed by the second sensor 66. For example, the controller 50 can control the motor of the band saw machine 32 to deaccelerate the movement of the blade 10 along the central longitudinal axis 56 toward the workpiece 54 in response to a predetermined amount of decrease in the second level of force.

The exemplary controller 50 can be configured to dynamically control the band saw machine 32 to change at least one of a direction, velocity and acceleration of rectilinear movement of the blade 10 along the central longitudinal axis 56 only in response to increases in at least two of the first level of force sensed by the first sensor 64, the second level of force sensed by the second sensor 66, and the third level of force sensed by the third sensor 68. For example, the controller 50 can control the motor of the band saw machine 32 to stop moving the blade 10 toward the workpiece 54 and instead move the blade 10 away from the workpiece 54 in response to predetermined amounts of increase in at least two of first, second and third levels of force. In one or more operational settings, a rise in the level of force sensed by only one of the first sensor 64, second sensor 66, and third sensor 68 may not dictate changing the direction of movement. In one example, increases in force sensed by the first sensor 64 (associated with the back support 58) and one or both of the second sensor 66 and third sensor 68 can indicate that a change of direction should occur. It is noted that velocity and acceleration can be changed additionally or alternatively in response to detection of increases in the level of force sensed by two of the first sensor 64, second sensor 66, and third sensor 68.

The exemplary controller 50 can be configured to maintain at least one of the direction, the velocity or the acceleration of rectilinear movement of the blade 10 along the central longitudinal axis 56 despite an increase in one of the first level of force sensed by the first sensor 64, the second level of force sensed by the second sensor 66, and the third level of force sensed by the third sensor 68. The exemplary controller 50 can be configured to maintain an attribute of position/movement of the blade 10 in response to a decrease in at least a second of the first level of force sensed by the first sensor 64, the second level of force sensed by the second sensor 66, and the third level of force sensed by the third sensor 68. For example, the controller 50 can control the motor of the band saw machine 32 to maintain current movement of the blade 10 despite an increase in one of first, second and third levels of force when a decrease is sensed for one of the other two levels of force. Thus, the various sensed levels of force can be cumulatively applied in controlling movement of the blade 10.

The exemplary controller 50 can be configured to dynamically control the band saw machine 32 to change at least one of a direction, velocity and acceleration of rectilinear movement of the blade 10 along the central longitudinal axis 56 only in response to increases in the second level of force sensed by the second sensor 66 and the third level of force sensed by the third sensor 68, despite no increase in the first level of force sensed by the first sensor 64. For example, the controller 50 can control the motor of the band saw machine 32 to stop moving the blade 10 toward the workpiece 54 and instead move the blade 10 away from the workpiece 54 in response to predetermined amounts of increase in both of the second and third levels of force. While the conditions sensed by the first sensor 64 may be most indicative of the stress on the blade 10, in one or more operational settings, the level of force against the first sensor 64 may not be indicative of the stress on the blade 10.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method of cutting a workpiece with a band saw comprising:
   rotating, with a band saw machine, a blade about a central longitudinal axis;
   supporting a back edge of the blade during said rotating with a back support;
   supporting a first lateral side edge of the blade during said rotating with a first lateral side support;
   monitoring, with a first sensor, a first level of force exerted against the back support;
   monitoring, with a second sensor, a second level of force exerted against the first lateral side support;
   moving, with the band saw machine, the blade along the central longitudinal axis during said rotating;
   dynamically controlling, with a computing device having one or more processors, the band saw machine during said moving in response to at least one of the first level of force and the second level of force;
   supporting a second lateral side edge of the blade, opposite to the first lateral side edge, during said rotating with a second lateral side support;
   monitoring, with a third sensor, a third level of force exerted against the second lateral side support; and
   wherein said dynamically controlling is further defined as dynamically controlling, with the computing device having one or more processors, the band saw machine during said moving in response to all of the first level of force and the second level of force and the third level of force.

2. The method of claim 1 wherein said dynamically controlling is further defined as:
   dynamically controlling, with the computing device, the band saw machine to change a direction of rectilinear movement of the blade along the central longitudinal axis in response to an increase in the first level of force sensed by the first sensor.

3. The method of claim 1 wherein said dynamically controlling is further defined as:
   dynamically controlling, with the computing device, the band saw machine to change a direction of rectilinear movement of the blade along the central longitudinal axis in response to a decrease in the first level of force sensed by the first sensor.

4. The method of claim 1 wherein said dynamically controlling is further defined as:
   dynamically controlling, with the computing device, the band saw machine to change a velocity of rectilinear movement of the blade along the central longitudinal axis in response to an increase in the first level of force sensed by the first sensor.

5. The method of claim 1 wherein said dynamically controlling is further defined as:
   dynamically controlling, with the computing device, the band saw machine to change a velocity of rectilinear movement of the blade along the central longitudinal axis in response to a decrease in the first level of force sensed by the first sensor.

6. The method of claim 1 wherein said dynamically controlling is further defined as:
   dynamically controlling, with the computing device, the band saw machine to change an acceleration of rectilinear movement of the blade along the central longitudinal axis in response to an increase in the first level of force sensed by the first sensor.

7. The method of claim 1 wherein said dynamically controlling is further defined as:

dynamically controlling, with the computing device, the band saw machine to change an acceleration of rectilinear movement of the blade along the central longitudinal axis in response to a decrease in the first level of force sensed by the first sensor.

8. The method of claim 1 wherein said dynamically controlling is further defined as:
dynamically controlling, with the computing device, the band saw machine to change a direction of rectilinear movement of the blade along the central longitudinal axis in response to an increase in the second level of force sensed by the second sensor.

9. The method of claim 1 wherein said dynamically controlling is further defined as:
dynamically controlling, with the computing device, the band saw machine to change a direction of rectilinear movement of the blade along the central longitudinal axis in response to a decrease in the second level of force sensed by the second sensor.

10. The method of claim 1 wherein said dynamically controlling is further defined as:
dynamically controlling, with the computing device, the band saw machine to change a velocity of rectilinear movement of the blade along the central longitudinal axis in response to an increase in the second level of force sensed by the second sensor.

11. The method of claim 1 wherein said dynamically controlling is further defined as:
dynamically controlling, with the computing device, the band saw machine to change a velocity of rectilinear movement of the blade along the central longitudinal axis in response to a decrease in the second level of force sensed by the second sensor.

12. The method of claim 1 wherein said dynamically controlling is further defined as:
dynamically controlling, with the computing device, the band saw machine to change an acceleration of rectilinear movement of the blade along the central longitudinal axis in response to an increase in the second level of force sensed by the second sensor.

13. The method of claim 1 wherein said dynamically controlling is further defined as:
dynamically controlling, with the computing device, the band saw machine to change an acceleration of rectilinear movement of the blade along the central longitudinal axis in response to a decrease in the second level of force sensed by the second sensor.

14. The method of claim 1 wherein said dynamically controlling is further defined as:
dynamically controlling, with the computing device, the band saw machine to change one of a direction, velocity and acceleration of rectilinear movement of the blade along the central longitudinal axis in response to an increase in one of the second level of force sensed by the second sensor and the third level of force sensed by the third sensor.

15. The method of claim 1 wherein said dynamically controlling is further defined as:
dynamically controlling, with the computing device, the band saw machine to change at least one of a direction, velocity and acceleration of rectilinear movement of the blade along the central longitudinal axis only in response to increases in at least two of the first level of force sensed by the first sensor, the second level of force sensed by the second sensor, and the third level of force sensed by the third sensor.

16. The method of claim 1 wherein said dynamically controlling is further defined as:
maintaining, with the band saw machine under the control of the computing device, at least one of a direction, velocity and acceleration of rectilinear movement of the blade along the central longitudinal axis despite an increase in at least a first of the first level of force sensed by the first sensor, the second level of force sensed by the second sensor, and the third level of force sensed by the third sensor in response to a decrease in at least a second of the first level of force sensed by the first sensor, the second level of force sensed by the second sensor, and the third level of force sensed by the third sensor.

17. The method of claim 1 wherein said dynamically controlling is further defined as:
dynamically controlling, with the computing device, the band saw machine to change at least one of a direction, velocity and acceleration of rectilinear movement of the blade along the central longitudinal axis only in response to increases in the second level of force sensed by the second sensor and the third level of force sensed by the third sensor, despite no increase in the first level of force sensed by the first sensor.

* * * * *